United States Patent [19]

Matsch et al.

[11] 4,173,531
[45] Nov. 6, 1979

[54] NITRIFICATION-DENITRIFICATION OF WASTEWATER

[75] Inventors: Ladislas C. Matsch, Amherst; Raymond F. Drnevich, Clarence, both of N.Y.

[73] Assignee: Union Carbide Corporation, New York, N.Y.

[21] Appl. No.: 854,321

[22] Filed: Nov. 23, 1977

[51] Int. Cl.² .............................................. C02C 1/06
[52] U.S. Cl. .......................................... 210/5; 210/6; 210/8; 210/16; 210/DIG. 28; 210/DIG. 29
[58] Field of Search ......................................... 210/3–8, 210/16, 17, DIG. 28, DIG. 29

[56] References Cited
U.S. PATENT DOCUMENTS

| 3,236,766 | 2/1966 | Levin | 210/6 |
| 3,409,545 | 11/1968 | Albertson | 210/5 |
| 3,617,540 | 11/1971 | Bishop et al. | 210/16 |
| 3,654,147 | 4/1972 | Levin et al. | 210/6 |
| 3,681,235 | 8/1972 | Topol | 210/8 X |
| 3,764,523 | 10/1973 | Stankewich | 210/5 |
| 3,930,998 | 1/1976 | Knopp et al. | 210/5 |
| 3,964,998 | 6/1976 | Barnard | 210/7 |
| 3,994,802 | 11/1976 | Casey et al. | 210/5 |
| 4,042,493 | 8/1977 | Matsch et al. | 210/6 |

OTHER PUBLICATIONS

Barnard, "Biological Denitrification," *Water Pollut. Control,* 1973, vol. 72, Part 6, pp. 705–717.

*Primary Examiner*—Thomas G. Wyse
*Attorney, Agent, or Firm*—John C. Lefever

[57] ABSTRACT

In activated sludge-type wastewater treatment, nitrified oxygenated liquid-solid from the oxic zone is retained under anoxic conditions for denitrification and release of nitrogen gas, and the denitrified liquid-solid returned to the oxic zone.

11 Claims, 6 Drawing Figures

NITRIFICATION-DENITRIFICATION OF WASTEWATER

This invention relates to an activated sludge wastewater treatment method for removal of nitrogenous compounds from BOD-containing wastewater by first nitrification and then denitrification to obtain a purified effluent, preferably along with removal of phosphorus compounds.

The typical wastewater stream contains both carbonaceous compounds and nitrogenous compounds (generally present as $NH_4+$) exerting an oxygen demand and measured as $BOD_5$ and $BOD_{20}$ respectively. In many areas compliance with water pollution control laws requires that wastewater treatment objectives consider the removal of both nitrogen and phosphorus in addition to the normal reduction of carbonaceous compounds and suspended solids. Phosphorus and nitrogen-containing compounds are essential nutrients for cellular growth. Accordingly, their continuous release into natural receiving waters results in progressive fertilization and eutrophication, thereby creating ubiquitous blooms of aquatic vegetation, endangering aquatic life and causing a gradual degradation of the quality and esthetics of the water. Since the ultimate growth of these aquatic blooms depends on nutrient availability, reduction in the levels of phosphorus and nitrogeneous compounds would limit such undesirable growth.

Principal methods employed for removing ammonia-nitrogen from wastewater involve ammonia stripping by air, break point chlorination, ion exchange and biological nitrification. Although ammonia stripping may be a viable approach when treatment volumes are small and ammonia concentrations high, most wastewater applications can generally be characterized as requiring the treatment of large liquid volumes (e.g., millions of gallons per day) and low ammonia concentrations. As a result, ammonia stripping is not widely practiced as a method for removing ammonia-nitrogen from wastewater. The use of break point chlorination also suffers because of the large treatment volumes and the potential dangers associated with its use. Additional disadvantages stem from the requirement of stringent pH control, high chemicals costs and the potential for the formulation of chloramines which are detrimental to aquatic life. In a similar manner, ion exchange has not received wide-spread attention because of the large quantities of regenerant required in wastewater treatment systems and because of the high costs stemming from the need to continually replace the ion exchange medium. The only ammonia-nitrogen removal technique to achieve widespread acceptance in the wastewater treatment art has been biological nitrification.

In the well-known activated sludge system, domestic sewage, wastewater from industrial plants, or a combination of the two, is treated with air or other oxygen-containing gas in the presence of the micro-organisms (hereinafter referred to as "bacteria") furnished by the recycled activated sludge, to effect degradation of organic biologically degradable material. Following such oxidative treatment in one or more stages, the mixed liquor is introduced into a solid concentration zone, i.e., settler or clarifier, from which a portion of the settled solids are recycled to provide the activated sludge containing the bacteria effective in consuming and digesting the organic matter (BOD) in the waste. The supernatant liquor from the settler or clarifier is returned to receiving waters generally after some further purification or disinfection treatment. While earlier commercial activated sludge plants employ air to furnish the oxygen needed to sustain the metabolic function of the bacteria, more recent commercial installations employ, in one or more of the oxidation stages, aeration gas having a higher oxygen content than the 21% contained in atmospheric air.

Biological nitrification is useful for wastewater treatment primarily because of its easy adaptability to the conventional activated sludge sewage treatment system. Additionally, considerable development work on the kinetics of autotropic ammonia-oxidizing bacteria has greatly reduced the uncertainty that once surrounded the system design for both one sludge and two sludge biological nitrification systems. However, biological nitrification alone does not solve the problems of nitrogen pollution; it merely removes the oxygen demand exerted by ammonia. Nitrates remaining in the sewage after the conversion of ammonia by the nitrosomonas and nitrobacter bacteria together with the nitrite intermediate are now recognized as other major sources of nitrogen pollution. These nitrogen compounds are also suspected of leading to the excessive fertilization and algae infestation of receiving waters. Additionally, nitrites in excessive amounts in drinking water are believed to form carcinogenic nitrosamines with amines present in the human diet, while both nitrates and nitrites in excessive concentrations have been linked to methaemaglobinaemia in young babies. As a result, a concerted effort is now underway to develop new processes for efficiently eliminating the total quantity of nitrogeneous compound pollutants.

Nitrates and nitrites in wastewater are typically removed by the process of biological denitrification. Widespread heterotrophic bacteria in the presence of an organic carbon source and in an oxygen deficient environment are able to reduce nitrate-nitrogen and nitrite-nitrogen to primarily elemental nitrogen and nitrous oxide, which are then released as gases. Until recently, methanol was widely considered as the organic carbon source, but new processes have been developed which employ alternate carbon sources including the BOD in the wastewater itself.

Since the prior art has taught that complete denitrification requires that the total quantity of soluble nitrites and nitrates be brought into contact with the denitrifying bacteria in an oxygen deficient environment, previously available biological nitrification-denitrification systems all perform the denitrification function on a stream similar in size to or greater in size than the raw wastewater flow. As a result, such treatment systems are disadvantageous from an economic standpoint since large treatment vessels are required for the denitrification function.

The most widely used prior art biological nitrification-denitrification systems have been the so-called two-or three-sludge systems. The two-sludge system comprises a first stage where combined carbonaceous and nitrogenous oxygen demand removal (nitrification) occurs and a second stage wherein denitrification occurs. The three-sludge system comprises a first stage for carbonaceous removal, a second stage for nitrogeneous oxygen demand removal (nitrification) and a third stage for denitrification. Each stage is characterized by a first treatment vessel, an aeration zone in the case of carbonaceous and nitrogeneous oxygen demand removal and an anaerobic zone in the case of denitrification, followed by a clarification-type solids concentration zone for recovering the activated solids for recycle to the previous zones. The disadvantages associated with this type of treatment are the large investment costs connected with multiple treatment and clarification zones and the large chemical costs connected with the need for nutrient addition (e.g., normally methanol) to the anaerobic denitrification zone.

To overcome these deficiencies, processes have been developed which incorporate an anaerobic denitrification zone into the main wastewater flow prior to the clarification zone which is used to recover the sludge for nitrification. This type of treatment system obviates both the need for an additional clarification zone and the need for nutrient addition (e.g., methanol) since a portion of the organic carbon fraction of the raw wastewater is now used as the carbon source. Two examples of this treatment approach are described in Barnard U.S. Pat. No. 3,964,998 and Casey et al. U.S. Pat. No. 3,994,802. The Barnard process subjects the influent wastewater flow to a first anaerobic (anoxic) zone, an aerobic zone, a second anaerobic (anoxic) zone, and then a clarification zone for recovery of an activated sludge. The activated sludge is recycled for mixing with the influent wastewater prior to the first anaerobic (anoxic) zone. In addition, at least a major portion of the mixed liquor leaving the aerobic zone is also recycled for mixing with the influent. The Casey process, on the other hand, subjects the influent wastewater to a first aerobic (oxic) zone, an anaerobic (anoxic) zone, a second aerobic (oxic) zone and a clarification zone for recovery of an activated sludge. The activated sludge is recycled for mixing with the influent wastewater in the first aerobic zone, and mixed liquor leaving an aerobic (oxic) zone is recycled to a previous anaerobic (anoxic) zone.

As disclosed, both of these treatment systems subject the total wastewater flow, in addition to a large recycle stream, to the step of denitrification. As a result, large treatment volumes requiring a large capital investment are necessary. This economic penalty seriously detracts from the benefits gained by these total treatment systems.

In addition to nitrogeneous compounds, many wastewater streams also contain high levels of phosphorus pollutants. To confine the treatment approach solely to nitrogen removal while ignoring phosphorus removal can, in many cases, be shortsighted. Phosphorus, just as nitrogen, is an essential nutrient for cellular growth. Likewise, its continuous release into natural receiving waters will gradually result in eutrophication. Normally when biological nitrification-denitrification has been practiced, phosphorus removal has conventionally been provided by chemical treatment. The procedures normally used include pretreatment by precipitation and removal upstream of the activated sludge system and post-treatment by precipitation and removal downstream of the activated sludge system. A third treatment approach involving combined treatment by precipitation and removal in situ of the activated sludge system is not normally used with biological nitrification, since the necessary increase in solid wasting not only reduces the colony of carbonaceous-compound consuming bacteria but also seriously impairs or may actually inhibit the growth of ammonia-oxidizing bacterial. It is well-known that the growth rate for ammonia oxidizing bacteria is considerably slower than for carbon-consuming bacteria.

Chemical phosphorus removal techniques, although effective, have proved to be expensive. The processes require the treatment of large volumes of low phosphorus-containing liquid, thereby requiring massive, chemical precipitant doses. Concomitantly, the generation of large volumes of chemical sludge creates an additional disposal problem.

The combined biological removal of phosphorus and nitrogen, on the other hand, has not been widely practiced Levin et al. U.S. Pat. No. 3,654,147 describes one such combined treatment system. In the Levin et al process, influent wastewater is mixed with recycled activated sludge to form a mixed liquor and is aerated at a rate sufficient to reduce the BOD content of the wastewater, convert ammonia present in the wastewater to nitrate and cause organisms present to take up phosphates in excess of their requirements for growth. In one embodiment the mixed liquor is then passed to a denitrification holding tank where it is retained under anaerobic or partially aerobic conditions for a sufficient duration for denitrifying bacteria to breakdown the nitrate content. The denitrification bacteria continue their respiration by the reduction of the nitrate content and release gases such as elemental nitrogen and nitrous oxide. The denitrified mixed liquor is then reaerated to cause the sludge bacteria to take-up phosphates which leaked out during the denitrification stage, and is subsequently passed to a sedimentation vessel where a nitrogen-depleted, phosphate-rich sludge is separated from a nitrogen-depleted, phosphate-depleted effluent.

The phosphate-rich sludge is then passed to a phosphate stripping zone where it is treated, e.g., by maintaining the sludge under anaerobic conditions, to cause the sludge intracellular phosphates to leak into the surrounding liquid phase. A phosphate-rich supernatant liquor is produced upon settling of the sludge and is separated from the phosphate and nitrogen-depleted sludge. The phosphate-rich liquid is then passed to a precipitation zone where phosphates are removed by chemical treatment, while the phosphate and nitrogen-depeleted sludge is recycled to the aeration zone as activated sludge.

The Levin et al process effectively avoids certain of the problems in conventional biological nitrification-chemical phosphorus removal systems. Specifically, the operating costs associated with the chemical precipitant for phosphorus removal and the quantity of chemical sludge produced have been substantially reduced, since a considerably smaller volume of liquid is now treated for phosphate removal. However, since this improvement was obtained with the added expense of a re-aeration zone needed to prevent phosphate loss in the effluent, the Levin et al process is not totally acceptable. Furthermore, as with the previously identified nitrification-denitrification processes the Levin et al process subjects the total wastewater flow plus the recycled sludge to a separate step of denitrification. This adds additional expense to an already expensive system.

In another embodiment, Levin et al attempt to avoid both of these deficiencies by passing the oxygenated liquor from the aeration zone directly to the sedimentation vessel. This sedimentation stage also performs the denitrification function so that the added volume of a denitrification holding tank and the reaeration tank have been eliminated. Unfortunately it was determined that it is not possible to precisely control the liquor retention time in the sedimentation vessel so that denitrification occurs with little phosphate solubilization.

Fluctuations in wastewater feed rates and environmental conditions will frequently cause high phosphorus concentrations in the effluent. The denitrification process with the attendant generation of gases such as elemental nitrogen and nitrous oxide will also cause sludge solids to float to the surface in the sedimentation vessel, thereby increasing the suspended solids levels in the effluent. Such solids losses will inhibit, or in the extreme, prohibit nitrification in the aeration zone. This effect occurs because ammonia-oxidizing bacteria are inherently slow growers, and depletion in this nitrifying colony in the final water effluent will adversely limit the required population.

Accordingly, it is an object of this invention to provide an activated sludge-type process for the nitrification-denitrification of wastewater which requires reduced tankage and power consumption.

It is a further object of this invention to provide an integrated process for biological phosphate and nitrogenous compound removal which requires reduced tankage and power consumption. Other objects and advantages will be apparent from the ensuing disclosure and appended claims.

SUMMARY OF THE INVENTION

This invention relates to an activated sludge wastewater treatment process for removal of nitrogenous compounds by nitrification-denitrification.

Briefly this invention is practiced in the activated sludge-type system in which wastewater containing nitrogenous compounds is mixed in an oxic zone in the presence of carbonaceous compounds with oxygen-containing gas and activated sludge containing carbon-consuming and nitrogen-oxidizing bacteria for sufficient duration to nitrify the nitrogenous compounds and form nitrified oxygenated mixed liquor which is discharged from the oxic zone and passed to a separate zone to effect concentration of solids from liquor with at least a major part of the concentrated solids being returned to the oxic zone as activated sludge such that the total residence time of solids (SRT) is at least two days.

More specifically in this invention nitrified oxygenated liquid-solid is withdrawn to an anoxic zone at volume flow rate less than one-half the volume flow rate of nitrified oxygenated mixed liquor entering the solids concentration zone. Preferably, the nitrified oxygenated liquid-solid introduced to the anoxic zone comprises a portion of the concentrated solids recovered from the solids concentration zone and amounts to only between 5 and 25% of th volume flow rate of the nitrified oxygenated mixed liquor entering the solids concentration zone as operation in the manner is sufficient in most cases to achieve above 70% denitrification. The nitrified oxygenated liquid-solid is maintained in the anoxic zone under anoxic conditions for a period between 0.4 and 36 hours and sufficient to denitrify the liquid-solid and form nitrogen-containing gas. The latter is released from the anoxic zone and the denitrified liquid-solid is returned to the oxic zone.

As used herein, "oxic zone" refers to a biochemical oxidation zone in which the oxygen concentration in the gas over the liquid or liquor is at least about 160 mm. Hg. (corresponding to air at atmospheric pressure) and the dissolved oxygen concentration in the liquid or liquor containing biochemically oxidizable material and bacteria is above about 0.3 mg/l and preferably at least 2 mg/l. Also as used herein "anoxic zone" refers to a zone in which the dissolved oxygen concentration in the liquid or liquor is below about 0.3 mg/l and preferably below about 0.2 mg/l such that nitrate and nitrate compounds are reduced to gases such as elemental nitrogen and nitrous oxide by heterotrophic denitrifying bacteria.

It has been unexpectedly discovered that remarkably high levels of denitrification are achieved when only a small fraction of the nitrified oxygenated liquid-solid is treated in the anoxic zone and in any event an amount corresponding to less than one-half the volume flow rate of nitrified oxygenated mixed liquor entering the solids concentration zone. The total percent denitrification far exceeds the percent denitrification that can be attributed to denitrification of the nitrified oxygenated liquid-solids fed to the anoxic zone, and in fact is a multiple of the former. By way of example, in one typical experiment over a two week period, the anoxic zone received an activated sludge recycle stream with a flow rate of about 10 percent of the oxygenated liquor entering the clarifier (i.e. only 10 percent of the nitrates and nitrites entering the clarifier) yet about 73 percent denitrification was achieved.

Although the reasons for this remarkable performance are not fully understood, it is hypothesized that a culture of bacteria is developed in the practice of this invention which prefers nitrate to oxygen as the final electron acceptor in the respiration process. As a result the denitrification function is carried from the anoxic zone and continued in the oxic zone to which the denitrified liquid-solid is returned. The high oxygen uptake rate prevalent in the initial portion of the oxic zone appears to aid in the continuation of denitrification. In this manner, the combined volume of both the oxic and anoxic zones is used for denitrification of the wastewater.

As previously stated, the invention is practiced in an activated sludge system wherein the total mean residence time of solids (SRT) is at least two days. This is necessary to maintain a suitable population of nitrogen-oxidizing-bacteria (nitrifiers) for nitrification. As well recognized by those skilled in wastewater treatment, SRT is affected by treatment temperatures with longer times required in colder climates, so that SRT values as high as 40 days may be needed in some instances.

It has also been stated that to practice this invention nitrified oxygenated liquid-solid is withdrawn and introduced to an anoxic zone at volume flow rate less than one-half the volume flow rate of nitrified oxygenated mixed liquor entering the solids concentration zone. Higher volume flow rates are outside the scope of the invention since the minor further increase afforded in the denitrification is offset by the economic penalty imposed by the higher tankage, larger piping and increased pumping requirements. The nitrified oxygenated liquid-solid may for example be a portion of the solid from the solids concentration zone as for example activated sludge (underflow) from a clarifier. In another embodiment the withdrawn nitrified oxygenated liquid-solid is a portion of the nitrified oxygenated mixed liquor discharged from the oxic zone and upstream the solids concentration zone.

The nitrified oxygenated liquid-solid is maintained in the anoxic zone for a period between 0.4 and 36 hours. The lower limit is based on a minimum time requirement for denitrification to occur to a substantial extent and the upper limit is to avoid a septic condition with significant $H_2S$ generation. Furthermore, excessively long retention times in the anoxic zone do not appreciably improve the percent denitrification and require excessively large tanks. If phosphorus removal is not practiced along the denitrification in a single tank, the anoxic zone retention time is less than 24 hours and preferably between 2 and 10 hours.

When the wastewater also contains phosphorus pollutants to be removed, the wastewater is retained in the oxic zone for a contact time of at least 0.5 hour and sufficient for the bacteria to take up phosphate. Phosphate-enriched concentrated solids are formed in the zone and phosphate-enriched concentrated solids are recovered in the solids concentration zone and at least a portion thereof is withdrawn and introduced to the anoxic zone as the nitrified oxygenated liquid-solid. In a preferred embodiment the denitrified liquid-solid formed in the anoxic zone is phosphate-enriched sludge and at least a portion thereof is passed to a phosphate stripping zone to form phosphate-depleted denitrified sludge and phosphate-enriched liquid. The phosphate-depleted denitrified sludge is flowed to the oxic zone as at least part of the returned denitrified liquid-solid.

Figure 1:
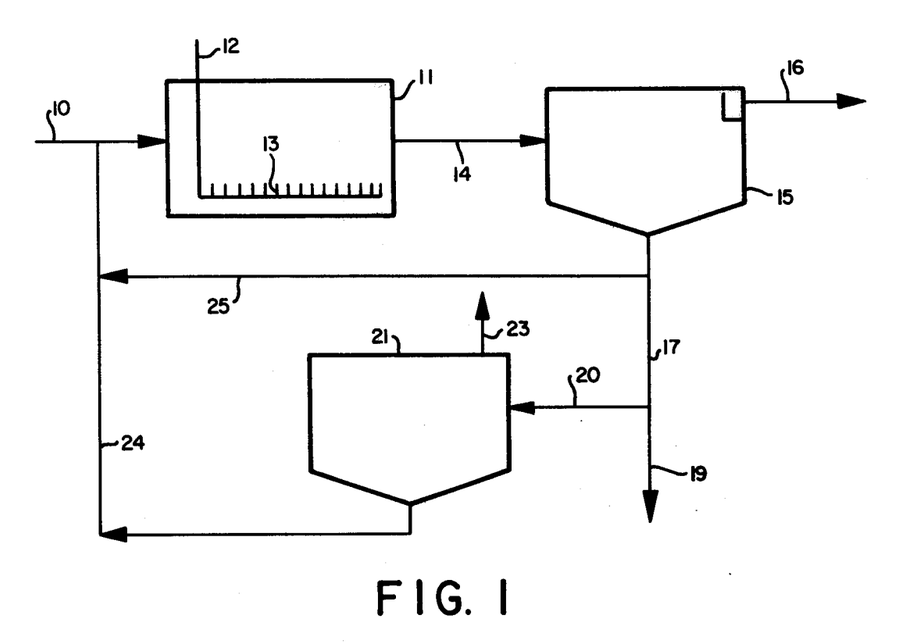
FIG. 1 is a schematic flowsheet of apparatus capable of practicing the invention using an anoxic denitrification zone for treatment of concentrated activated sludge portion as the withdrawn nitrified oxygenated liquid-solid.

This invention will be more clearly understood by referring to the drawings. FIG. 1 illustrates a single step nitrification-denitrification, activated sludge system which operates according to the present invention. Raw sewage, which may previously have been subjected to the conventional steps of screening, grit removal and primary sedimentation is mixed with recycled activated sludge from conduits 24 and 25, hereinafter described, and is passed through conduit 10 to aeration tank 11 comprising the oxic zone. Oxygen-containing gas such as air is introduced into tank 11 in a manner well-known to one of ordinary skill through conduit 12 and diffusing means 13. In aeration tank 11 the sewage containing carbonaceous and nitrogenous compounds and activated sludge are aerated for sufficient duration to biochemically oxidize the carbonaceous compounds and convert ammonia present in the influent sewage substantially to nitrate. After aeration is complete, the nitrified oxygenated mixed liquor is passed through conduit 14 to clarification vessel 15 as the solids concentration zone. In clarification vessel 15, an activated sludge is gravity-separated from the oxygenated mixed liquor. A substantially nitrate-and ammonia-depleted effluent is discharged for disposal in a conventional manner through conduit 16.

The activated sludge settled in tank 15 is removed therefrom through conduit 17 as the nitrified oxygenated liquid-solid. A portion of this sludge may be passed through conduit 25 and mixed with the influent sewage in conduit 10 while another portion may be delivered to waste through conduit 19. The remainder is passed through conduit 20 to denitrification holding tank 21 as the anoxic zone. The flow rate in conduit 20 is less than one-half the flow rate of nitrified oxygenated mixed liquor in conduit 14 and preferably between 5 and 25% thereof. The lower preferred limit of 5% is based on the limit of solids concentration systems whereas the 25% preferred upper limit is based on the economic penalty of larger equipment and higher power costs to achieve a relatively small further increase in percent denitrification. In the denitrification holding tank 21 the sludge is maintained under conditions in which there is insufficient oxygen present to satisfy the needs of the bacteria present in the sludge, i.e. anaerobic or only partially aerobic conditions. These bacteria continue respiration by the reduction of the nitrate content of the sludge. Gases such as elemental nitrogen and nitrous oxide are formed in tank 21 and are evolved from the system through vent 23. After a holding period of between 0.4 and 36 hours a nitrate-depleted sludge is removed from denitrification holding tank and is passed through conduit 24 to form the remainder of the previously mentioned activated sludge.

Figure 2:
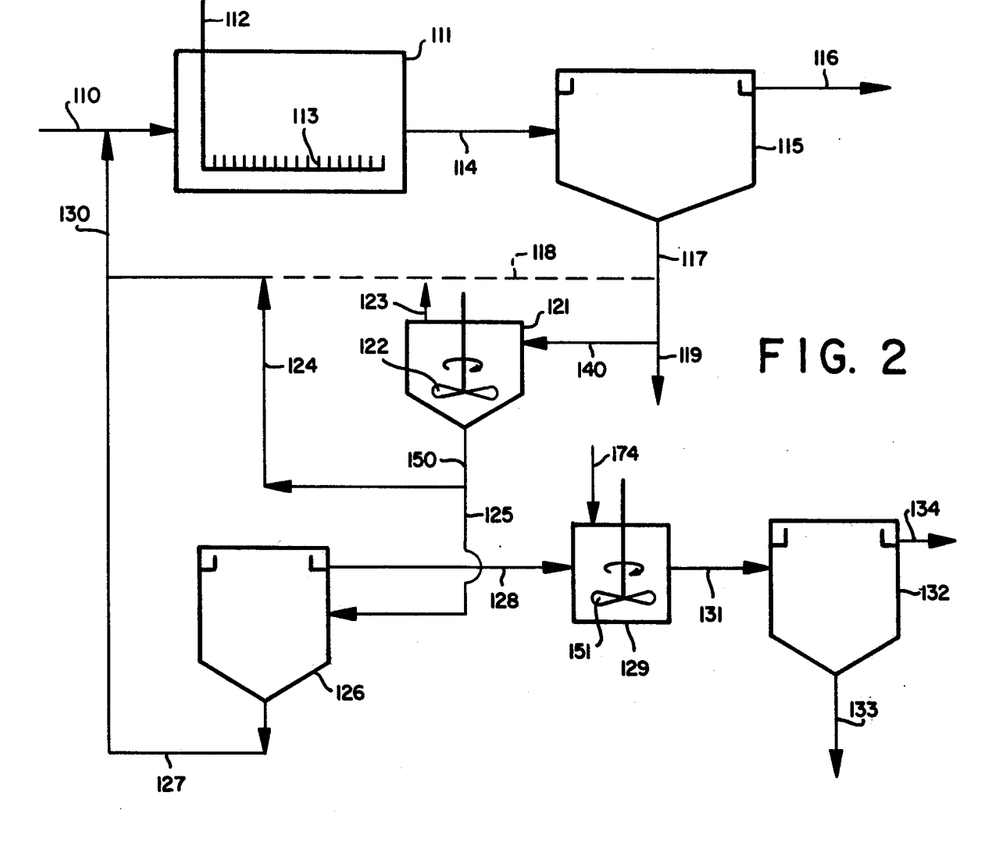
FIG. 2 is similar to FIG. 1 but additionally provides apparatus suitable for phosphorus compound removal using a separate stripper tank.

FIG. 2 illustrates another single step nitrification-denitrification activated sludge system which operates according to the present invention. In this embodiment, in addition to biological nitrification-denitrification, biological phosphorous removal is also employed. Once again denitrification is performed in an anoxic holding tank located in the sludge recycle loop. Phosphorus removal is also accomplished in the sludge loop but occurs in a tank separate from the denitrification holding tank. Raw sewage is mixed with recycled activated sludge from conduit 130 and is passed through conduit 110 to aeration tank 111 as the oxic zone. In aeration tank 111, the raw sewage and activated sludge mixture (hereafter referred to as mixed liquor) is aerated for sufficient duration to convert ammonia present in the influent sewage to nitrate and to promote the biological uptake of phosphorus. As taught by U.S. Pat. No. 3,236,766 to Levin, (incorporated herein to the extent pertinent) under suitable aerobic conditions, bacteria present in the sludge can take-up phosphate in excess of their requirements for growth. Oxygen-containing gas such as air is introduced into tank 111 through conduit 112 and diffusing means 113. In addition to the removal of ammonia phosphorus from the sewage, a high degree of BOD removal is also obtained in tank 111.

After aeration is complete, the nitrified oxygenated mixed liquor is passed through conduit 114 to clarification vessel 115 as the solids concentration zone. In clarification vessel 115 a phosphate-rich sludge settles and separates from the nitrified oxygenated mixed liquor and a substantially phosphate-depleted and nitrate and ammonia-depleted effluent is discharged for disposal in the conventional manner through conduit 116.

The phosphate-rich sludge is removed from the settling tank through conduit 117 and a portion of this sludge may be passed through conduit 118 (shown as a dotted line) to form part of the before-mentioned activated sludge. Another portion is delivered to waste through conduit 119 and the remainder is passed as the aforementioned nitrified oxygenated liquid through conduit 140 to denitrification holding tank 121 as the anoxic zone. In denitrification holding tank 121 the sludge is maintained under conditions in which there is insufficient oxygen present to satisfy the needs of the bacteria present in the sludge. These bacteria continue respiration by the reduction of the nitrate content of the sludge; gases such as elemental nitrogen and nitrous oxide formed in the process are evolved from the system and vented through conduit 123. Mixing means 122 ensure intimate contact between the sludge bacteria and the soluble nitrate content of the sludge.

A phosphate-rich, nitrate-depleted sludge is removed from denitrification holding tank 121 through conduit 150. A portion of this sludge is preferably passed through conduit 124 to form part of the aforementioned activated sludge. The remaining phosphate-enriched sludge (also identified as the denitified liquid-solid) is passed through conduit 125 to the phosphate stripper tank 126 for treatment to cause the sludge bacteria to release phosphates. As described in the aforementioned Levin U.S. Pat. No. 3,236,766, this treatment may be accomplished by holding the mixture under anaerobic conditions for a period of time between about 2 and 10 hours.

In phosphate stripper 126, a phosphate-depleted sludge is separated from a phosphate-rich supernatant liquid and the former is passed through conduit 127 and forms part of the aforedescribed activated sludge. The phosphate-rich liquid is passed through conduit 128 to "quick mix" tank 129 where it is intimately contacted with lime introduced through conduit 174 to precipitate dissolved phosphates. The precipitated phosphate-containing liquid is passed through conduit 131 to sedimentation vessel 132. In vessel 132, a phosphate-free liquid may be discharged for disposal in a conventional manner through conduit 134 or, for example, may alternatively be returned to the influent sewage stream and a predominately chemical sludge is removed from conduit 133.

Figure 3:
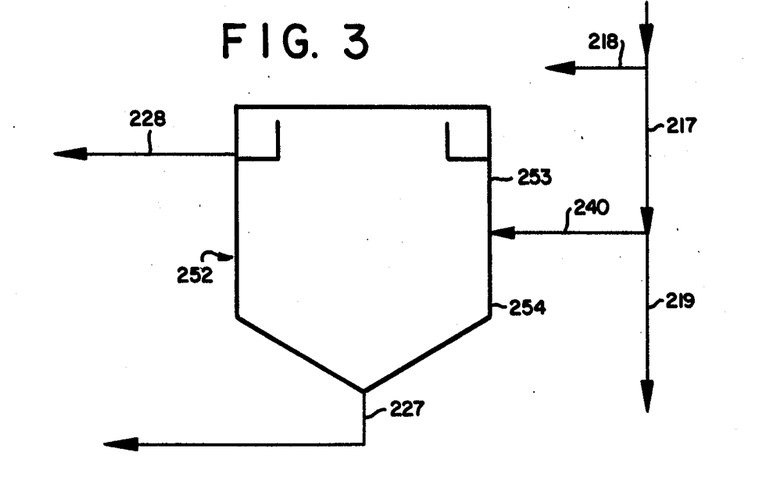
FIG. 3 is a schematic flowsheet of a single tank serving both functions of denitrification and phosphorus removal.

Although the two tank system for denitrification and phosphorus removal illustrated in FIG. 2 is preferred, it may be replaced with the single tank system shown in FIG. 3. The portion of the phosphate rich sludge recovered from the secondary clarifier 115 of the FIG. 2 embodiment and passed through conduit 140 to the denitrification holding tank 121 therein is in this introduced embodiment through conduit 240 instead to tank 252 which serves the dual function of denitrification and phosphorus removal. Tank 252 comprises two functional zones, an upper zone 253 and a lower zone 154. In the upper zone 253 bacteria in the sludge utilize the nitrate-nitrogen content associated therewith as the final electron acceptor in their respiration. As a result, phosphorus release, which normally occurs readily under anaerobic conditions, is initially inhibited. As the sludge descends further into tank 252, the nitrate-nitrogen content is depleted and phosphate release (solubilization) ensues. Such phosphate solubilization occurs in the lower zone 254 of tank 252. In the denitrification zone 253 of tank 252 gases such as elemental nitrogen and nitrogen and nitrous oxide are formed. These gases are formed within the sludge floc particles causing them to float towards the surface of tank 252. This action decreases the plug flow nature of the tank 252 and results in non-ideal behaviour of the single tank system. A phosphate depleted sludge is subsequently recovered from the bottom of tank 252 in conduit 227 and is recycled to the aeration (oxic) zone (not shown). A phosphate-rich liquid is removed from the upper portion of tank 252 in conduit 228 and can be further processed as described in accordance with the FIG. 2 embodiment. Because of the dual function of tank 252, the nitrified oxygenated liquid-solid is preferably retained therein for a period of 6–24 hours. Because of the potential problems created by floating sludge and the increased tankage required in the so-called single tank system, separate tanks for denitrification and phosphorus removal are preferred in systems requiring sizable reductions in the phosphorus and nitrogenous pollutant levels.

Figure 4:
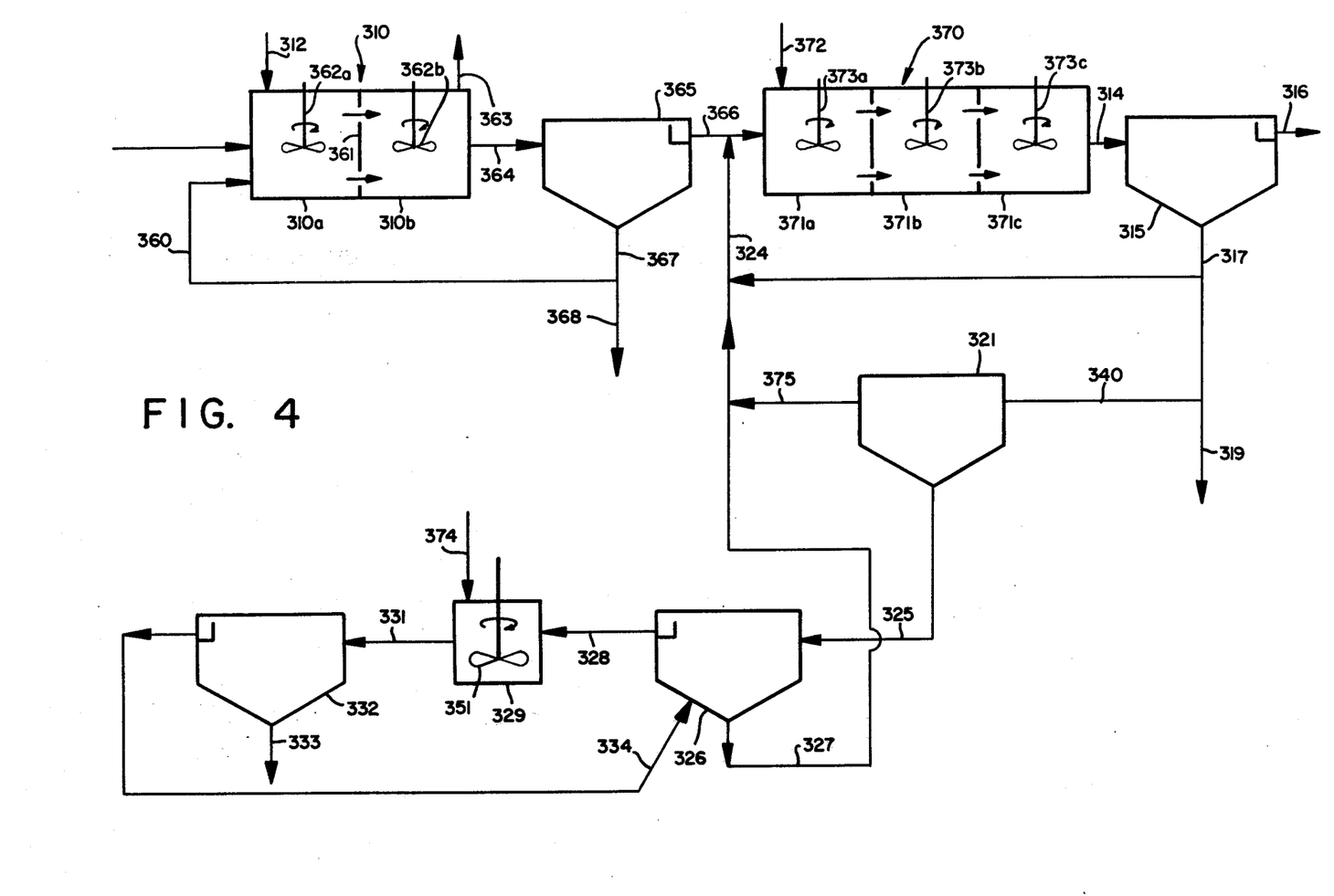
FIG. 4 is a schematic flowsheet of apparatus capable of practicing a two step carbonaceous removal-nitrification system with anoxic denitrification and phosphorus stripping in separate tanks joined to the nitrification zone.

FIG, 4 illustrates still another embodiment of this invention wherein a two step nitrification system is employed, preferably the type described in U.S Pat. No. 3,764,523 to Stankewich (incorporated herein to the extent pertinent). Wastewater such as muncipal sewage enters the first section of oxic zone 310 which is divided into two separate compartments 310a and 310b. Oxygen-containing gas of at least 50 percent oxygen by volume is introduced to first compartment 310a through conduit 312. Recycled activated sludge is also introduced to first compartment 310a through conduit 360 although the BOD-containing feed water and sludge may be mixed prior to introduction in oxic zone 310 if desired. Openings are provided in partition 361 to allow partially oxygenated liquor and partially oxygen-depleted aeration gas to flow from first compartment 310a to second compartment 310b.

The aforedescribed streams are intimately mixed in compartments 310a and 310b of first oxic section 310 by agitation means 362a and 362b. In this way, aeration gas is continuously recirculated in intimate contact with the liquor in first oxic section 310 so as to maintain a desired D.O. level of at least 2 gm/l. Oxygen-depleted gas is discharged from second compartment 310b through conduit 363.

A major part of the carbonaceous compounds in the wastewater is biochemically oxidized in first oxic section 310 and at the end of the mixing step first oxygenated liquor is discharged through conduit 364 to first clarification zone 365. A partially purified supernatant liquid (also referred to as first effluent) is discharged from clarification zone 365 through conduit 366 having lower carbonaceous content (e.g. $BOD_5$ of 20–100 mg/l) but substantially the initial nitrogenous compound content of the wastewater. A first sludge stream is withdrawn from the clarifier bottom through conduit 367 and at least a portion thereof is recycled through conduit 360 to chamber 310 for inoculation of the incoming BOD-containing water. Any sludge not needed for recycle is discharged through conduit 368 to waste.

The partially purified first effluent from clarifier 365 comprises the feed stream to the second nitrification section 370 of the oxic zone. Nitrification section 370 is constructed in an analogous manner to first section 310, except that three separate compartments 371a, 371b, and 371c are provided. In brief, the first effluent in conduit 366 enters chamber first compartment 371a and is mixed therein with at least 50 percent (by volume) oxygen-containing second aeration gas introduced through conduit 372 and nitrified sludge recycle introduced through conduit 324 to form oxygenated second liquor. Openings are provided in partitions between the first and second compartments 371a and 371b, and between the second and third compartments 371b and 371c to allow partially oxygenated second liquor and partially oxygen-depleted second aeration gas to flow cocurrently through the compartments.

A dissolved oxygen content of at least 2 mg/l is maintained in second nitrification section 370 by controlling the feed rate of oxygen-containing gas through conduit 372 and the power input to agitators 373a, 373b, and and 373c. After the desired liquid contact time of for example of 30–240 minutes, the oxygenated second liquor is withdrawn through conduit 314 to clarification-type solids separation zone 315. A purified second effluent separated in clarifier 315 is discharged through conduit 316. Similarly, second sludge is withdrawn from the clarifier bottom through conduit 317. One portion may be recycled to second nitrification section 370 through conduit 324, while another portion is passed to denitrification tank 321 through conduit 340. Second sludge not needed for recycle can be wasted through conduit 319.

Two step activated sludge systems for removing both carbonaceous and nitrogenous compounds from wastewater were known in the art prior to the invention of Stankewich U.S, Pat. No. 3,764,923 but could not reliably maintain an adequate colony of ammonia oxidizing bacteria for depletion of the nitrogenous oxygen demand. Ammonia-oxidizing bacteria require a greater period of time for growth than do carbon-consuming bacteria, and so for design purposes, the population dynamics of the nitrifiers are limiting. In the aforementioned Stankewich invention a mixed colony of both carbon-consuming bacteria and ammonia-oxidizing bacteria is maintained within the second or nitrification step and this greatly enhances the ease of maintaining a proper colony of ammonia-oxidizing bacteria. According to Stankewich the presence of the carbon-consuming bacteria improves the settling characteristics of the nitrifiers, thereby permitting a better retention of these bacteria within the system and accordingly reducing their loss in the second effluent.

In this embodiment, the anoxic zone-denitrification tank 321 is operated as the thickening zone. This zone is maintained under anaerobic or semi-aerobic conditions so that bacteria in the sludge reduce the nitrate-nitrite (hereinafter referred to as nitrate) content thereof. The nitrate-depleted supernatant is recycled to the aeration zone through conduit 375 while the nitrate-depleted, phosphate-rich sludge is passed through conduit 325 to the phosphate stripper 326. By operating the denitrification tank 321 in the thickening mode, a smaller sized stripper tank can be used. This is because the size of the stripper tank is primarily determined by the ratio of influent phosphate concentration to the volatile suspended solids (VSS) concentration in the sludge to the stripper tank. By employing a thickening tank ahead of the stripper, the sludge VSS level can be significantly increased. Therefore, at the same retention time for phosphate release, the stripper becomes much smaller.

The phosphate stripper tank 326 is preferably operated as taught in U.S. Pat. No. 4,042,493 to Matsch et al. The sludge stream from conduit 325 is passed downwardly in tank 326 against an upwardly flowing elutriant stream introduced in the lower region of tank 326 through conduit 334. At least the lower region of tank 326 is maintained under unaerobic conditions to induce phosphate solubilization. The elutriant stream can be characterized as a stream with a low solids and a low phosphate concentration. As this stream flows upwardly through tank 326, it displaces soluble phosphates into the supernatant liquid. This liquid is removed from tank 326 through conduit 328 and is subsequently mixed with lime introduced through conduit 374 to "quick mix" tank 329. The phosphate-precipitant containing liquid is then passed through conduit 331 to sedimentation zone 332 where a chemical sludge is recovered in conduit 333 and a low phosphate and low solids containing supernatant is withdrawn in conduit 344. In this embodiment, this stream is used as the aforementioned elutriation liquid. The phosphate-depleted sludge recovered from phosphate stripper 326 then flows through conduit 327 as part of the recycled activated sludge stream for nitrification section 370.

Figure 5:
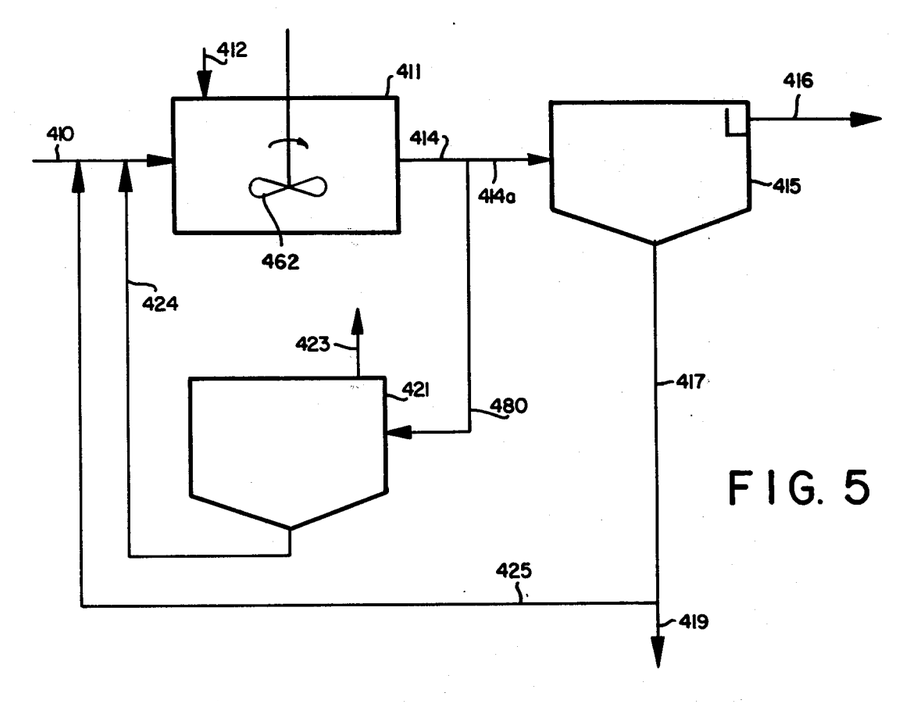
FIG. 5 is a schematic flowsheet of apparatus similar to FIG. 1 but with treatment of nitrified oxygenated mixed liquor as the withdrawn nitrified oxygenated liquid-solid.

FIG. 5 illustrates still another embodiment of the present invention. Raw sewage, which may previously have been subjected to the conventional steps of screening, grit removal, and primary sedimentation is mixed with recycled activated sludge from conduit 425 and recycled denitrified oxygenated mixed liquor from conduit 424 hereinafter described, and is passed to aeration (oxic) zone 411 through conduit 410. Air or oxygen is introduced to aeration zone 411 in a manner well-known to one of ordinary skill through conduit 412. The sewage and activated sludge are mixed for example by mechanical means 462 and aerated for sufficient duration to convert ammonia present in the influent sewage substantially to nitrate.

After aeration is complete, the nitrified oxygenated mixed liquor is removed from aeration zone 411 through conduit 414. A minor portion of the mixed liquor is diverted through conduit 480 to anoxic denitrification zone 421 as the withdrawn nitrified oxygenated liquid-solid, while the major fraction of the mixed liquor is passed through the conduit 414a to clarification zone 415 for solids concentration. In the practice of this invention, the volume flow rate ratio of stream 480 to stream 414a is below 0.4 and the size of denitrification tank 421 is minimized. The mixed liquor passed to zone 421 is maintained therein under anoxic conditions for at least 0.4 hours, e.g., 3 hours. The denitrified mixed liquor fraction in anoxic zone 421 is then passed through conduit 424 into aeration zone 411 either directly or through wastewater feed conduit 410. Gases such as elemental nitrogen and nitrous oxide are formed in tank 421 and are vented through conduit 423.

The undivered nitrified oxygenated mixed liquor in conduit 414a is passed to clarification zone 415 where an activated sludge is separated from a clarified effluent. The clarified effluent is substantially nitrate-and ammonia-depleted and is discharged for disposal in a conventional manner through conduit 416. The activated sludge is removed from solids concentration zone 415 through conduit 417. A portion of this sludge is passed through conduit 425 and is mixed with influent sewage in conduit 410, while another portion may be intermittantly or continuously delivered to waste through conduit 419 at a rate sufficient to maintain the overall SRT above 2 days.

Figure 6:
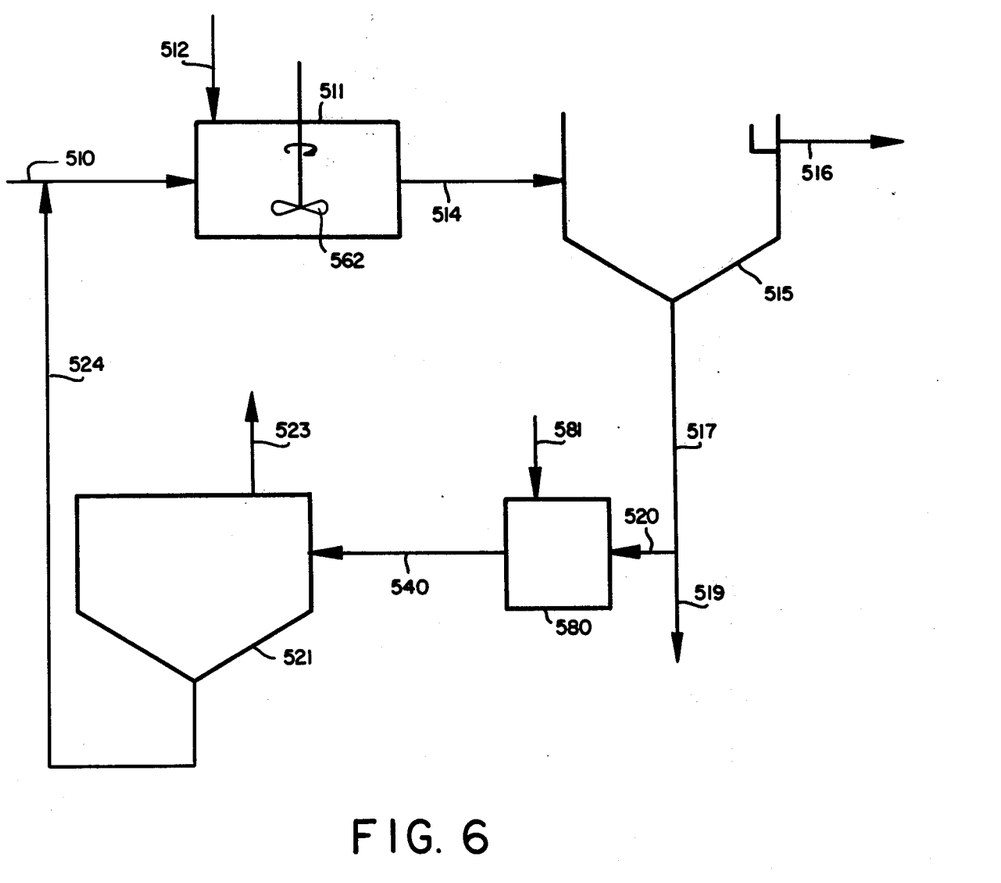
FIG. 6 is a schematic flowsheet of apparatus suitable for practicing a contract-stabilized activated sludge portion comprises the withdrawn nitrified oxygenated liquid-solid.

FIG. 6 illustrates a contact-stabilization embodiment of the invention. The contact-stabilization process is an adaptation of the conventional activated sludge process, which was developed to take advantage of the absorptive properties of activated sludge. It has been postulated that BOD removal occurs in two stages in the activated sludge process. The first is the absorptive phase during which the colloidal, finely suspended, and dissolved organics are adsorbed by the activated sludge.

The second phase, oxidation, then occurs, and the absorbed organics are metabolically assimilated. Whereas in conventional activated sludge process, both phases are occurring in a single tank, the contact stabilization system provides a separate tank for each phase to proceed somewhat independent of the other. The aeration volume requirements of a contact stabilization system are approximately 50 percent of those of a conventional system and it is sometimes possible to double the plant capacity of an existing conventional plant by redesigning it to use contact stabilization.

In this embodiment, raw sewage, which may have been subjected to conventional pre-treatment steps, is mixed with recycled activated sludge from conduit 524 and is passed to the contact section 511 of the oxic zone through conduit 510. Oxygen-containing gas such as air is introduced into section 511 in a well-known manner through conduit 512. In the contact section 511, the sewage and activated sludge mixture (mixed liquor) is mixed using mechanical means 462 and aerated for sufficient duration to oxidize the ammonia content therein substantially to nitrate and to promote the absorption of dissolved organics.

After aeration in zone 511 is complete, the partially oxygenated liquor is passed through conduit 514 to clarification vessel 515. In clarification vessel 515, an activated sludge is separated from the mixed liquor. A nitrate-and-ammonia-reduced effluent is discharged for disposal in a conventional manner through conduit 516.

The activated sludge settled in tank 515 is removed therefrom through conduit 517. A portion of this sludge may be delivered to waste through conduit 519 while the remainder is then passed through conduit 520 to the stabilization section 580 of the oxic zone. In the stabilization tank, the activated sludge is aerated for sufficient duration to promote the metabolic assimilation of the absorbed organics. Oxygen-containing gas such as air is introduced into tank 580 in a well-known manner through conduit 581. After aeration and mixing in tank 580 is complete, the nitrified activated sludge is passed through conduit 540 to denitrification tank 521. In the denitrification tank the sludge is maintained under anoxic conditions. The organisms continue respiration by the reduction of nitrate content of the sludge. Gases such as elemental nitrogen and nitrous oxide are formed in dinitrification tank 521 and are evolved from the system thrugh vent 523. A nitrate-reduced sludge is removed from tank 521 as the denitrified liquid-solid and is passed through conduit 524 to form the activated sludge introduced into the contact section 511.

This invention and its advantages are illustrated in several examples.

EXAMPLE 1

A combined single step nitrification-denitrification and phosphorous removal pilot system was operated for three months in a manner similar to the FIG. 2 embodiment. The stripper tank 226, however, was operated as taught in Matsch et al U.S. Pat. No. 4,042,493 and described in connection with tank 326 of FIG. 4, i.e., with a low solids and low phosphate containing elutriant stream for stripping soluble phosphates. Referring to FIG. 2, during this time the influent sewage in conduit 110 ranged from about 17° C. to 23° C. in temperature. The aeration zone 111 consisted of either three or six stages of 10 gallons each which were fed with air through diffusers 113 at a rate of about 8 l/min. The dissolved oxygen level of the mixed liquor was maintained between about 2.0 and 7.0 mg/l. The oxygenated liquor was discharged into a 14 gallon clarification tank 115 wherein a sludge underflow with a suspended solids level between 12,000 and 22,000 mg/l was separated in conduit 117 from a clarified effluent liquid in conduit 116. The phosphate-rich sludge flow in conduit 117 comprised between about 15 and 25 percent of the influent wastewater volume flow in conduit 110 and between about 13 and 20 percent of the oxygenated liquor volume flow in conduit 114. Between about 40 and 60 percent of the sludge in conduit 117 was passed directly through conduit 118 and joining conduit 130 to the aeration zone 111. The remainder (comprising between about 5 and 12 volume percent of the oxygenated liquor flow in conduit 114) was passed to the anoxic denitrification zone 121 through conduit 140. The denitrification zone 121 consisted of either a 5 gallon or 3 gallon capacity, well-stirred vessel. During this test, retention time in the anoxic denitrification tank varied between about 3 and 6 hours. The denitrified effluent from tank 121 passed directly to phosphate stripping zone 126 through conduit 125. The phosphate and nitrate depleted sludge was passed through conduit 127 for mixing with the influent sewage in conduit 110. Sludge was periodically wasted from clarification zone 115 through conduit 119 at a rate sufficient to maintain the overall SRT during this experimental period between about 6 days and 40 days.

The benfits of this invention can be readily understood by examining a typical two week operating period for the aforedescribed system. During this time, the influent total phosphorous, total Kjedhal nitrogen and COD content of the sewage stream varied from about 20 mg/l, 25 mg/l and 175 mg/l to about 34 mg/l 37 mg/l and 265 mg/l respectively. The procedure for measuring total phosphorous, which includes all of the orthophosphates both soluble and insoluble and organic and inorganic species, is found in Sections 223C and 223F of "Standard Methods" American Public Health Association, 15th edition (1971). The effluent values varied from about 0.7 mg/l, 1.8 mg/l and 18 mg/l to about 1.9 mg/l, 2.5 mg/l and 37 mg/l respectively.

These values correspond to average reductions in phosphorous, total Kjedhal nitrogen and COD of about 91 percent, 92 percent and 86 percent respectively. The effluent was also examined for its concentration of nitrate-nitrogen and nitrate-nitrogen and nitrite-nitrogen which taken as a sum varied between about 7 mg/l and 10 mg/l. Assuming that the total quantity of ammonia-nitrogen oxidized to nitrate-nitrogen and nitrite-nitrogen can be calculated by the difference between the total influent Kjeldahl nitrogen and total effluent Kjeldahl nitrogen and considering the quantity of nitrate-nitrogen and nitrite-nitrogen in the effluent, one can readily determine by the following equation the average percentage of denitrification (oxidized-nitrogen removal) that occurred during this two week testing period to be about 73 percent Percent
Denitrification$= (1 - (NO_3 - N_{eff} + NO_2 - N_{eff})/(TKN_{inf} - TKN_{eff}) \times 100\%$ This result is highly unexpected since the anoxic denitrification holding tank only received a recycle stream with a flow rate of only about 10.0 percent of the oxygenated liquor flow rate into the secondary clarifier.

Tables I and II summarize the data taken during the entire three month testing period of the FIG. 2-type system. The testing period was divided into four phases of eighteen days each and the pertinent average operating variables for each phase are listed in the tables. During the first three phases, an aeration volume of 30 gallons was used (i.e., 3 stages of aeration); while the fourth phase employed an aeration volume of 60 gallons (i.e., 6 stages of aeration). As one can see for the entire three months of operation, the total Kjedahl nitrogen; phosphate and COD removal levels respectively averaged above 87 percent, 94 percent and 87 percent. Furthermore, during each phase of operation, the system respectively provided about 71 percent, 68 percent, 54 percent and 25 percent denitrification of oxidized ammonia nitrogen. Such results are entirely unexpected since during each phase of operation a stream on only 10.0 percent, 9.2 percent, 8.1 percent and 10.9 percent of the mixed liquor flow rate was passed to the denitrification holding tank. The relatively poor total nitrogen removal evident during Phase 4 was due in part to the extremely long system SRT, i.e., 39 days. At long retention times the rate of metabolism of the nitrate reducing bacteria i.e., low due to the low level of oxidizable substrate. Additionally, the long aeration time probably resulted in conversion of some of the nitrate reducing bacteria back to preferentially utilizing oxygen as the final electron acceptor.

TABLE I

| Parameter | Phase I | Phase 2 | Phase 3 | Phase 4 |
| --- | --- | --- | --- | --- |
| Wastewater Influent | | | | |
| Flow (1/hr.) | 24.8 | 24.7 | 24.8 | 25.3 |
| pH | 7.2 | 7.4 | 7.4 | 7.5 |
| Temperature (°C.) | 17.5 | 17.5 | 19 | 20 |
| COD (mg/l) | 207 | 270 | 213 | 165 |
| TKN (mg/l) | 31 | 40.9 | 41 | 41.7 |
| Total P (mg/l) | 12.9 | 16.5 | 10.5 | 11.0 |
| TSS (mg/l) | 86 | 105 | 77 | 69 |
| VSS (mg/l) | 77 | 70 | 45 | 56 |
| BOD (mg/l) | 155 | 168 | 125 | 162 |
| Aeration Zone | | | | |
| Volume (Gal.) | 30 | 30 | 30 | 60 |
| Retention Time (Hr.) | 4.6 | 4.6 | 4.6 | 9.0 |
| MLVSS (mg/l) | 3127 | 2860 | 2750 | 2406 |
| D. O. (mg/l) | 5.0 | 5.0 | 4.5 | 4.5 |
| pH | 7.0 | 7.1 | 7.0 | 6.9 |
| Effluent | | | | |
| Flow (1/Hr.) | 24.8 | 24.7 | 24.8 | 25.3 |
| pH | 6.9 | 7.1 | 7.1 | 7.2 |
| COD (mg/l) | 29 | 26 | 30 | 21 |
| TKN (mg/l) | 2.3 | 2.5 | 2.4 | 1.4 |
| $NH_3$-N (mg/l) | 0.5 | 1.0 | 0.7 | 0.8 |
| $NO_3$-N (mg/l)* | 8.3 | 12.0 | 18.7 | 30.1 |
| Total P (mg/l) | 1.1 | 1.5 | 0.7 | 2.7 |
| TSS (mg/l) | 7 | 11 | 16 | 11 |
| VSS (mg/l) | 6 | 8 | 11 | 7 |
| BOD (mg/l) | 19 | 19 | 20 | 16 |
| SRT (Days) | 6.8 | 6.9 | 8.5 | 39.0 |

*Measured as $NO_3$-N and $NO_2$-N

TABLE II

| Parameter | Phase 1 | Phase 2 | Phase 3 | Phase 4 |
| --- | --- | --- | --- | --- |
| Oxygenated Liquor to Clarifier (1/Day) | 31.0 | 30.6 | 29.7 | 31.2 |
| Activated Sludge from Clarifier (1/Day) | 6.2 | 5.9 | 4.9 | 5.9 |
| Anoxic Denitrification Tank | | | | |
| Feed Flow (1/Hr.) | 3.1 | 2.8 | 2.4 | 3.4 |
| Tank Volume (Gal.) | 5 | 5 | 5 | 3 |
| Retention Time (Hr.) | 6.1 | 6.1 | 7.9 | 3.3 |
| TSS (mg/l) | 19,540 | 19,510 | 21,380 | 16,730 |
| VSS (mg/l) | 14,330 | 14,310 | 16,400 | 12,760 |
| Flow Ratio to Oxygenated Liquor | 0.10 | 0.092 | 0.081 | 0.109 |
| Phosphorus Stripper Tank | | | | |
| Feed Flow (1/Hr.) | 3.1 | 2.8 | 2.4 | 3.4 |
| Total P (mg/l) | 935 | 1,050 | 990 | 675 |
| Retention Time (Hr.) | 16.4 | 16.5 | 11.8 | 16.8 |
| TSS (mg/l) | 19,540 | 19,510 | 21,380 | 16,730 |
| VSS (mg/l) | 14,330 | 14,310 | 16,400 | 12,760 |
| Elutriation Flow to Stripper (1/Hr.) | 4.7 | 4.9 | 5.1 | 3.92 |
| Liquid from Stripper | | | | |
| Flow (1/Hr.) | 4.7 | 4.9 | 4.8 | 4.7 |
| Total P (mg/l) | 52 | 50 | 42 | 50 |
| pH | 6.7 | 6.7 | 7.0 | 7.0 |
| Sludge from Stripper | | | | |
| Flow (1/Hr.) | 3.1 | 2.8 | 2.7 | 2.65 |
| Total P (mg/l) | 807 | 904 | 800 | 820 |
| TSS (mg/l) | 19,740 | 19,700 | 18,910 | 19,290 |
| VSS (mg/l) | 15,010 | 14,400 | 14,500 | 14,790 |
| pH | 6.6 | 6.7 | 6.8 | 6.8 |

EXAMPLE II

In another testing period, a nitrification-denitrification system of the FIG. 3 type was tested in conjunction with a synthetic sewage stream. The same aeration system (with between 3 and 6 aeration stages in use during any one test) and clarification tank of the previously described Example I were used. In place of separate denitrification and phosphorus stripping tanks, a single 29 gallon vessel was used to accommodate both functions. The testing period comprised eleven months of experimentation which was subdivided into fifteen distinct data collection phases. Tables III and IV list the average data from three representative phases of operation. As in Example I the system provided excellent reduction in the level of total Kjedahl nitrogen, total phosphorus, and COD, respectively averaging above 69 percent, 89 percent and 89 percent. Similarly, the three phases average 72 percent nitrogen removal while a stream of below 16 percent of the influent flow or below 12.3 percent of the oxygenated liquor flow rate actually passed through the combined denitrification/stripper tank.

Although this so called single tank system provides excellent nitrogen and phosphorus removal, the system utilizing separate tanks for each function is preferred based on tankage requirements. It should be noted that in the three illustrated phases of the single tank system, the combined denitrification phosphorous stripping tank required retention times of 29.9 hours, 29.0 hours and 28.3 hours. By way of comparison the combined retention times of the separate denitrification tank and stripper tank of the four phases in the Tables I and II example were only 22.5 hours, 22.6 hours, 19.7 hours and 20.1 hours. All of these retention times are based on the sludge flow rate into the denitrification tank.

TABLE III

| Parameter | Phase I | Phase II | Phase III |
| --- | --- | --- | --- |
| Wastewater Influent | | | |
| Flow (1/Day) | 598 | 598 | 596 |
| pH | 7.4 | 7.4 | 7.2 |
| Temperature (° C.) | 11.2 | 9.2 | 9.6 |
| COD (mg/l) | 176 | 207 | 202 |
| TKN (mg/l) | 28.0 | 25.4 | 24.8 |
| Total P (mg/l) | 9.5 | 8.9 | 9.8 |

TABLE III-continued

| Parameter | Phase I | Phase II | Phase III |
|---|---|---|---|
| TSS (mg/l) | 50 | 35 | 37 |
| VSS (mg/l) | 33 | 21 | 30 |
| Aeration Zone | | | |
| Volume (Gal.) | 30 | 30 | 30 |
| Retention Time (Hr.) | 4.6 | 4.6 | 4.6 |
| MLVSS (mg/l) | 4130 | 4600 | 4380 |
| D.O. (mg/l) | 9.0 | 10.6 | 9.5 |
| pH | 7.3 | 7.2 | 7.2 |
| Effluent | | | |
| Flow (l/Day) | 598 | 598 | 596 |
| pH | 7.4 | 7.3 | 7.2 |
| COD (mg/l) | 17 | 22 | 19 |
| TKN (mg/l) | 3.3 | 7.6 | 10.7 |
| $NH_3$—N (mg/l) | 2.0 | 5.3 | 7.8 |
| $NO_3$—N (mg/l)* | 9.2 | 5.4 | 3.7 |
| Total P (mg/l) | 1.0 | 0.62 | 0.64 |
| TSS (mg/l) | 8 | 5 | 5 |
| VSS (mg/l) | 5 | 3 | 4 |
| SRT (Days) | 9.5 | 9.6 | 7.4 |

*Measured as $NO_3$—N and $NO_2$—N

TABLE IV

| Parameter | Phase I | Phase II | Phase III |
|---|---|---|---|
| Oxygenated Liquor to Clarifier (l/Day) | 759 | 759 | 757 |
| Activated Sludge From Clarifier (l/Day) | 161 | 161 | 164 |
| Anoxic Denitrification/ Phosphorus Stripper Tank | | | |
| Feed Flow (l/Day) | 88 | 91 | 93 |
| Volume (Gal.) | 29 | 29 | 29 |
| Retention Time (Hr.) | 29.9 | 29.0 | 28.3 |
| TSS (mg/l) | 18,520 | 20,320 | 24,480 |
| VSS (mg/l) | 12,220 | 12,400 | 19,830 |
| Total P (mg/l) | 647 | 599 | 753 |
| Flow Ratio to Oxygenated Liquor | 0.116 | 0.120 | 0.123 |
| Elutriation Flow (l/day) | 121 | 121 | 122 |
| Liquid from Stripper | | | |
| Flow (l/Day) | 128 | 129 | 131 |
| Total P (mg/l) | 36.3 | 34.6 | 31.5 |
| pH | 7.1 | 7.1 | 6.8 |
| Sludge from Stripper | | | |
| Flow (l/Day) | 81 | 83 | 84 |
| Total P (mg/l) | 683 | 594 | 738 |
| TSS (mg/l) | 17,340 | 19,800 | 26,270 |
| VSS (mg/l) | 11,440 | 12,080 | 21,280 |
| pH | 6.7 | 6.9 | 6.6 |

EXAMPLE III

In still another test, a contact-stabilization system of the type illustrated in FIG. 6 was used and the resulting data from two representative periods is summarized in Tables V and VI. In summary the COD removal during these periods averaged 81.4%, and 71.7% respectively. The TKN removal during these periods averaged 62.3%, and 41.9% respectively. Unexpectedly, this process provided oxidized nitrogen removals (percent denitrification) of 66.1%, and 58.1% while streams of only 30% and 40% of the quantity of the nitrified oxygenated liquid flow to the clarification vessel actually passed through the denitrification tank. It will be noted that the percent denitrification phase II was less than phase I despite the fact that a higher percent of the nitrified oxygenated liquor flow was introduced to the anoxic zone. This was due to the lower retention time in the anoxic zone, i.e., 0.43hr. compared to 1.35 hr.

TABLE V

| Parameter | Phase I | Phase II |
|---|---|---|
| Wastewater Influent | | |
| Flow (l/hr.) | 3.39 | 3.45 |
| pH | 6.8 | 6.9 |
| Temperature (°C.) | 22 | 22 |
| COD (mg/l) | 220 | 184 |
| TKN (mg/l) | 28.4 | 27.9 |
| Contact Tank | | |
| Volume (l) | 2 | 2 |
| Retention Time (hr.) | 0.59 | 0.58 |
| MLVSS (mg/l) | 6030 | 3260 |
| D.O. (mg/l) | 14 | 14 |
| pH | 6.8 | 6.9 |
| Effluent | | |
| Flow (l/hr.) | 3.39 | 3.45 |
| pH | 6.8 | 6.9 |
| COD (mg/l) | 41 | 52 |
| TKN (mg/l) | 10.7 | 16.2 |
| $NH_3$-N (mg/l) | 7.3 | — |
| $NO_3$-N (mg/l)* | 6.0 | 4.9 |
| TSS (mg/l) | 15 | 21 |
| VSS (mg/l) | 11 | 15 |
| SRT (Days) | 13 | 7 |

*Measured as $NO_3$-N and $NO_2$

TABLE VI

| Parameter | Phase I | Phase II |
|---|---|---|
| Activated Sludge from Clarifier (l/hr.) | 1.47 | 2.33 |
| Stabilization Tank | | |
| Tank Volume (l) | 1 | 2 |
| Feed Flow (l/hr.) | 1.47 | 2.33 |
| Retention Time (hr.) | 0.68 | 0.86 |
| pH | 6.3 | 6.3 |
| D.O. (mg/l) | 8.1 | 11 |
| VSS (mg/l) | 11,070 | 5,600 |
| Anoxic Denitrification Tank | | |
| Tank Volume (l) | 2 | 1 |
| Feed Flow (l/hr.) | 1.47 | 2.33 |
| Retention Time (hr.) | 1.35 | 0.43 |
| VSS (mg/l) | 9,132 | 5,640 |
| Flow Ratio to Contact Tank | 0.30 | 0.40 |

Although preferred embodiments of this invention have been described in detail, it will be appreciated that other embodiments are contemplated along with modifications of the disclosed features, as being within the scope of the invention. By way of illustration the solids concentration zones downstream the oxic zone could be other than the gravity sedimentation type, such as filtration systems. Also, the oxygen-containing aeration gas may be introduced as oxygen-rich gas in the FIGS. 1, 2, 5 and 6 embodiments. In this event the oxic zones are preferably covered and means are provided for venting oxygen-depleted aeration gas as illustrated in FIG. 4.

What is claimed is:

1. In the purification of wastewater by the activated sludge method in which wastewater containing nitrogenous compounds is mixed in an oxic zone in the presence of carbonaceous compounds with oxygen-containing gas and activated sludge containing carbon-consuming and nitrogen-oxidizing bacteria for sufficient duration to nitrify the nitogenous compounds and form nitrified oxygenated mixed liquor which is discharged from the oxic zone and passed to a separate zone to effect concentration of solids from liquor with at least a major part of the concentrated solids being returned to said oxic zone as said activated sludge such that the total mean residence time of solids (SRT) is at least two days, the improvement comprising withdrawing and introducing nitrified oxygenated liquid-solid to an anoxic zone at volume flow rate less than one-half the volume flow rate of nitrified oxygenated mixed liquor entering the solids concentration zone, maintaining said nitrified oxygenated liquid-solid in said anoxic zone under anoxic conditions for a period between 0.4 and 36 hours and sufficient to denitrify the liquid-solid and form nitrogen-containing gas, releasing said nitrogen-containing gas and returning the denitrified liquid-solid to said oxic zone.

2. A method according to claim 1 in which a portion of the solids from said solids concentration zone comprises the withdrawn nitrified oxygenated liquid-solid.

3. A method according to claim 2 in which the wastewater also contains phosphate and said wastewater is retained in said oxic zone for a contact time of at least 1 hour and sufficient for said bacteria to take up phosphate and phosphate-enriched concentrated solids are recovered in said solids concentration zone, a portion of said solids is withdrawn from said solids concentration zone and introduced to said anoxic zone as said nitrified oxygenated liquid-solid, the denitrified liquid-solid formed in said anoxic zone is phosphate-enriched sludge, at least a portion of the denitrified and phosphate-enriched sludge is passed to a phosphate stripping zone to form phosphate-depleted denitrified sludge and phosphate-enriched liquid, and flowing said phosphate-depleted denitrified sludge to said oxic zone as at least part of the returned denitrified liquid-solid.

4. A method according to claim 3 in which a portion of said denitrified and phosphate-enriched sludge from said anoxic zone is flowed directly to said oxic zone as another part of the returned denitrified liquid-solid.

5. A method according to claim 3 in which said wastewater is retained in said oxic zone for a contact time of less than 8 hours.

6. A method according to claim 2 in which the wastewater also contains phosphate and said wastewater is retained in said oxic zone for a period of at least 1 hour and sufficient for said bacteria to take up phosphate, phosphate-enriched concentrated solids are recovered in said solids concentration zone, a portion of said solids is withdrawn from said solids concentration zone and introduced to said anoxic zone as said nitrified oxygenated liquid-solid, phosphate-enriched liquid is discharged from the upper end of said anoxic zone and phosphate-depleted denitrified sludge is formed in the lower end of said anoxic zone and flowed to said oxic zone as at least part of the returned denitrified liquid-solid.

7. A method according to claim 6 in which said nitrified oxygenated liquid-solid is maintained in said anoxic zone for a period between 6 and 14 hours.

8. A method according to claim 2 in which said wastewater contains carbonaceous compounds, said oxic zone comprises a first section in which a major part of said carbonaceous compounds is biochemically oxidized and a second section, oxygenated first liquor is discharged from said first section and passed to a first solids concentration zone to effect concentration of first solids from liquid with at least a major part of the concentrated first solids being returned to said first section as first activated sludge, first effluent of lower carbonaceous compound content but substantially the initial nitrogenous compound of said wastewater is flowed from said first solids concentration zone to said second section of said oxic zone in which said nitrogenous compounds and additional carbonaceous compounds are biochemically oxidized, oxygenated second liquor is discharged from said second section and passed to a second solids concentration zone to effect concentration of second solids from liquid with at least a major part of the concentrated solids being returned to said second section as second activated sludge, a portion of said second solids comprises the withdrawn nitrified oxygenated liquid-solid and said denitrified liquid-solid from said anoxic zone is returned to the oxic zone second section.

9. A method according to claim 2 in which said nitrified oxygenated liquid-solid is maintained in said anoxic zone for a period between 2 and 10 hours.

10. A method according to claim 1 in which a portion of said nitrified oxygenated mixed liquor comprises the withdrawn nitrified oxygenated liquid-solid.

11. A method according to claim 1 in which the nitrified oxygenated liquid-solid comprises a portion of the solids from the solids concentration zone and is introduced to said anoxic zone at flow rate between 5%, and 25% of the oxygenated mixed liquor entering said solids concentration zone.

* * * * *

UNITED STATES PATENT AND TRADEMARK OFFICE
CERTIFICATE OF CORRECTION

PATENT NO. : 4,173,531
DATED : November 6, 1979
INVENTOR(S) : Ladislas C. Matsch and Raymond F. Drnevich It is certified that error appears in the above-identified patent and that said Letters Patent are hereby corrected as shown below:

Column 5, line 50, after "of" (first occurrance), change "th" to -- the --.

Column 9, line 54, change "154" to -- 254 --.
Column 10, line 39, after "2", change "gm/1" to -- mg/1 --.
Column 12, line 10, change "344" to -- 334 --.
Column 12, line 38, change "0.4" to -- 0.5 --.

Signed and Sealed this

Twenty-sixth Day of August 1980

[SEAL]

Attest:

SIDNEY A. DIAMOND

Attesting Officer    Commissioner of Patents and Trademarks